(12) United States Patent
Kozhaya et al.

(10) Patent No.: US 10,832,002 B2
(45) Date of Patent: Nov. 10, 2020

(54) SYSTEM AND METHOD FOR SCORING PERFORMANCE OF CHATBOTS

(71) Applicant: International Business Machines Corporation, Armonk, NY (US)

(72) Inventors: Joseph N. Kozhaya, Morrisville, NC (US); Ryan Anderson, Kensington, CA (US); Anita Govindjee, Ithaca, NY (US); Javier R. Torres, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 15/973,842

(22) Filed: May 8, 2018

(65) Prior Publication Data

US 2019/0347326 A1 Nov. 14, 2019

(51) Int. Cl.
*G06F 40/30* (2020.01)
*H04L 12/58* (2006.01)

(52) U.S. Cl.
CPC .............. *G06F 40/30* (2020.01); *H04L 51/02* (2013.01)

(58) Field of Classification Search
CPC ........ G06F 3/0484; G06F 3/0482; G06F 3/16; G06F 9/451; G06N 99/00
See application file for complete search history.

(56) References Cited

U.S. PATENT DOCUMENTS

| | | | |
|---|---|---|---|
| 8,818,926 B2 | 8/2014 | Wallace | |
| 8,949,377 B2 | 2/2015 | Makar et al. | |
| 9,647,968 B2 | 5/2017 | Smullen et al. | |
| 2002/0059045 A1 | 5/2002 | Tackett et al. | |
| 2014/0250195 A1 | 9/2014 | Capper et al. | |
| 2016/0094492 A1 | 3/2016 | Li et al. | |
| 2017/0180284 A1 | 6/2017 | Smullen et al. | |
| 2017/0243134 A1 | 8/2017 | Housman | |
| 2017/0255349 A1* | 9/2017 | Fletcher | H01L 41/22 |
| 2018/0090135 A1 | 3/2018 | Schlesinger et al. | |
| 2018/0095940 A1* | 4/2018 | Meixner | H04L 51/16 |
| 2018/0129484 A1* | 5/2018 | Kannan | G10L 15/1815 |
| 2018/0330258 A1* | 11/2018 | Harris | G06N 5/003 |
| 2018/0341382 A1* | 11/2018 | Zhu | G06F 3/0482 |
| 2019/0012198 A1* | 1/2019 | Ni | G06F 3/167 |
| 2019/0012714 A1* | 1/2019 | Bright | G06Q 30/0617 |

(Continued)

FOREIGN PATENT DOCUMENTS

CN 104091153 A 10/2014

OTHER PUBLICATIONS (2017) Uliyar, A Primer: Oracle Intelligent Bots, Powered by artificial intelligent, White Paper, Sep. 2017, pp. 1-28.*

(Continued)

*Primary Examiner* — Edgar X Guerra-Erazo
(74) *Attorney, Agent, or Firm* — Terrile, Cannatti & Chambers, LLP; Michael Rocco Cannatti

(57) ABSTRACT

A method, apparatus, system and a computer program product are provided for scoring performance of a chatbot by capturing specified node performance metrics based on user interactions with one or more nodes in a dialog flow for the chatbot; assigning a score to each of the one or more nodes based on the specified node performance metrics; and assessing a performance measure for at least a portion of the chatbot by combining scores assigned to selected nodes in the dialog flow.

20 Claims, 3 Drawing Sheets

(56) References Cited

U.S. PATENT DOCUMENTS

2019/0087391 A1* 3/2019 Cranshaw ............. G06F 40/117
2019/0102078 A1* 4/2019 Bhatt .................. G06F 3/04847
2019/0215283 A1* 7/2019 Nahum ................... G06F 3/16
2019/0220154 A1* 7/2019 Muramoto ............. H04L 51/04

OTHER PUBLICATIONS

Radziwill, N. et al.; "Evaluating Quality of Chatbots and Intelligent Conversational Agents"; https://andv.org/pdf/1704.04579.pdf; 2017.
Iachinski, A.; "AI, Robots, and Swarms—Issues, Questions, and Recommended Studies"; https://www.cna.org/CNA-files/PDF/DRM-2017-U-014796-FINAL.pdf.; Jan. 2017.
Anonymous; "A System for Extracting and Analyzing Tags and Sentiment Scores from Unstructured Text"; http://ip.com/IPCOM/000205102D; Mar. 15, 2011.
Anonymous; "Sentiment Analysis for Outbound Social Media Screening"; http://ip.com/IPCOM/000233590D; Dec. 17, 2013.
Anonymous; "Cognitive Build—Onboarding Patterns Using Sentiment Analysis"; http://ip.com/IPCOM/000250803D; Sep. 5, 2017.
Anonymous; "Sentiment Analysis for Social Media Screening"; http://ip.com/IPCOM/000236682D; May 8, 2014.

* cited by examiner

SYSTEM AND METHOD FOR SCORING PERFORMANCE OF CHATBOTS

BACKGROUND OF THE INVENTION

Increasingly used in all kinds of applications, sites, and messaging platforms, chatbots are intelligent, conversational software agents activated by natural language input (e.g., text, voice, or both) to provide conversational output responses and/or task execution functions. And chatbots are now easier to train and implement due to plentiful open source code, widely available development platforms, and implementation options via Software as a Service (SaaS). For example, the Watson Assistant service (formerly Conversation) enables developers to quickly develop chatbots for various applications and platforms by combining a number of cognitive techniques to build and train a chatbot by defining intents and entities and crafting dialog systems. And while there are some qualitative guidelines on how to build good chatbots, what is lacking is a method for measuring the performance of these chatbots. Without the ability to measure specific chatbot performance parameters, the dialog flow designer cannot identify areas for improvement in the dialog system. As a result, the existing solutions for evaluating and improving dialog systems are extremely difficult at a practical level.

SUMMARY

Broadly speaking, selected embodiments of the present disclosure provide a system, method, and apparatus for scoring chatbot performance by using an artificial intelligence and machine learning information handling system to instrument individual nodes in an automated system dialog flow to measure specified node performance metrics, to capture and analyze the specified node performance metrics based on user interactions with the dialog flow, to score each node with a weighted award or penalty based on the captured performance metrics, and to assess the performance for the overall dialog flow (or individual dialog flow paths) based on the award/penalty scores. To measure performance metrics, each real and/or virtual node in a dialog flow may be instrumented to track user communications with the node in terms of one or more performance metrics, such as the time, access count, content, sentiment, phase, tone, emotion, and outcome of each communication. To capture and analyze the specified node performance metrics, conversation chats between the chatbot and end users may be run through the system dialog flow, and each node may be analyzed using the specified node performance metrics to assess the node in terms of number and type of node accesses, time spent at each node, user's emotion or sentiment or tone, node outcomes, and the like. To score each node, penalty or reward scores may be applied to each node on the basis of user type/state/information, node efficiency, and/or outcome. For example, a node that efficiently moves a specific user type to a desired outcome may be scored with reward points, while another node which requires significant time for user action or otherwise results in undesired outcomes may be scored with penalty points. In addition, each score may be configurable (to allow for different user-defined functions) and/or weighted (to reflect that some nodes are more important than others). In addition to scoring each node on the basis of the performance metrics, node analysis may be performed to generate illuminating information about features that provide information about the user or process. To assess the dialog flow, a performance assessment may be computed for the overall dialog flow (or individual dialog flow paths) by combining the weighted scores for each node and/or outcome. The performance assessment may also generate illuminating information about user features. These steps may be repeated with different implementations of the dialog flow to quantitatively compare and contrast their performance. In addition, the performance assessments may be used to suggest performance improvements or flags to the dialog flow designer for making changes to one or more dialog flow nodes. In addition, the performance assessments may use machine learning to generate automated features and performance improvement suggestions to the dialog flow for achieving dialog flow outcomes based on user type and/or state.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
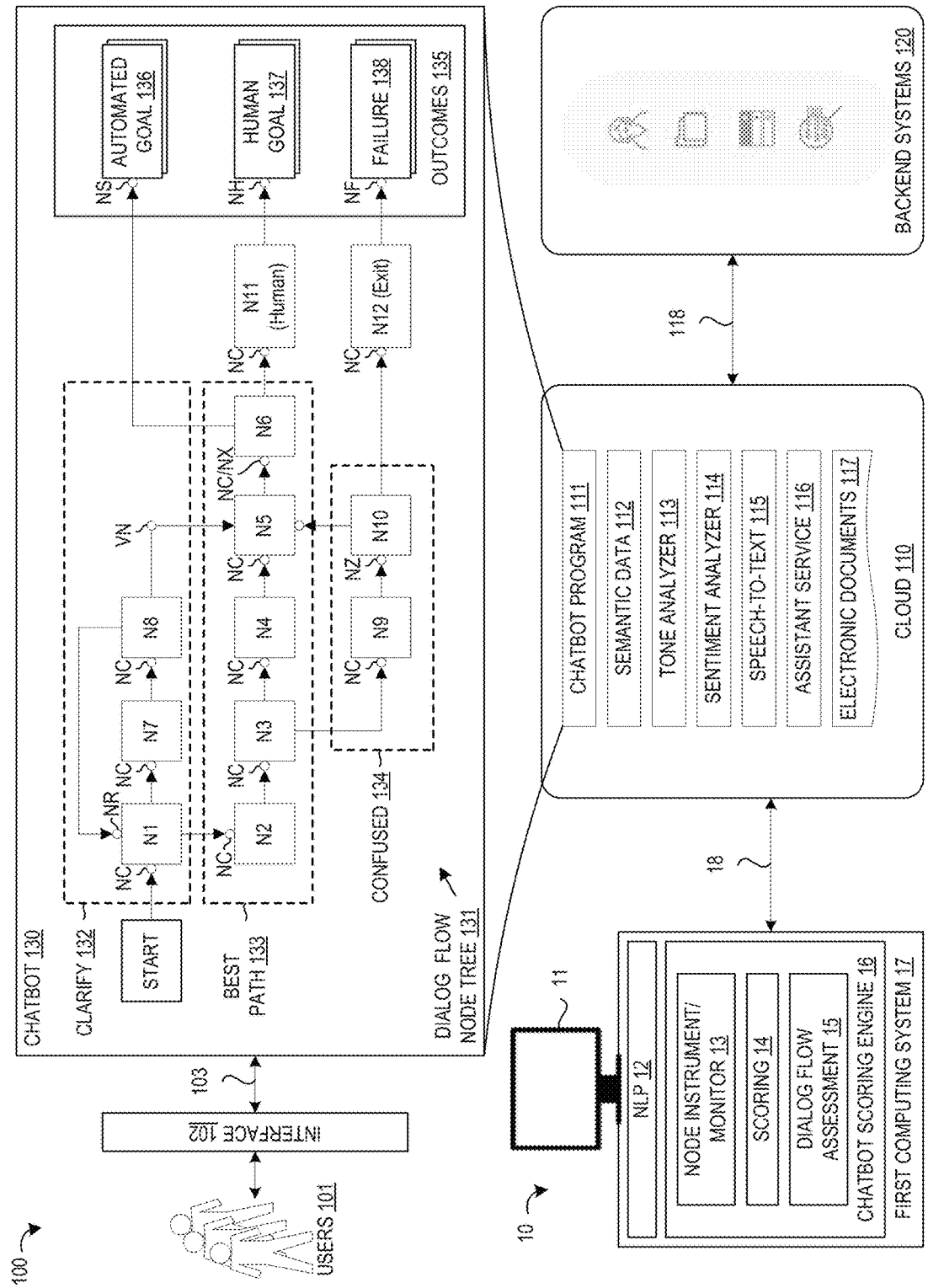
FIG. 1 depicts a system diagram in which a computing system uses a chatbot scoring engine to interact with a dialog flow and other cloud-based services to instrument and monitor user/chatbot interactions and evaluate the chatbot performance.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of computer-based conversational software agents, such as chatbots, by transforming measured performance metrics into a plurality of node performance scores to efficiently provide chatbot performance scoring, evaluation, and design improvements.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 schematically depicts a chatbot system 100 wherein one or more users 101 are connected across a user interface 102 to exchange chat messages with the chatbot 130 by interacting with the dialog flow 131 that is created and run by a chatbot back-end program 111. As used herein, "chat messages" as discussed herein refer to text-based, vocal, or image-based messages transmitted in real-time via chat messaging software over any sort of interface 102 or network 103 (such as the internet) between a user 101 and a chatbot 130. All specific types of chat messaging software, as well as all software protocols for sending and receipt of chat messages are contemplated for usage with the presently disclosed invention. In the situation that received chat messages are vocal in nature (i.e., spoken via human voice), speech recognition software serves to parse the vocal messages into text-based messages for further processing as discussed below. Alternately, if transmitted chat messages are text-based in nature, text-to-speech software may serve to convert text-based messages to vocal, as needed.

In various embodiments, the user(s) 101 employ a user interface 102 to exchange chat messages with the chatbot 130, where the interface 102 may be embodied as a user computer in the form of a mainframe or a mini computer, a terminal, a laptop, a tablet, a netbook personal computer (PC), a mobile device, a desktop computer, or any other sort of computing device. In whatever embodiment, the user computer/interface 102 may include hardware and software components, including a chat module and a user interface. The chat module represents software and/or hardware for a user computer/interface 102 to send and receive chat messages to the chatbot 130. After transmission of the chat messages by the user 101, appropriate responses generated by the chatbot 130 are transmitted back to the user 101 for display within the chat module. As understood by one of skill in the art, chat modules frequently appear as a scrolling display of the series of chat messages between conversation participants, but vocal conversations facilitated by text-to-speech software and speech recognition software are also contemplated herein. To display the chat messages, the user computer/interface 102 may include a display component for presenting an interface, such as a graphical user interface (GUI) for a user 101 to input data, read messages, and/or make selections presented.

In various embodiments, the network 103 represents, for example, an internet, a local area network (LAN), a wide area network (WAN) such as the Internet, and includes wired, wireless, or fiber optic connections. In general, network 103 may be any combination of connections and protocols that will support communications between user(s) 101 and chatbot 130.

Hosted by or connected to the cloud 110, the chatbot back-end program 111 provides chatbot functionality with natural language capabilities, such as intents/entities recognition, dialog management, and other supporting services, by using natural language processing, computational linguistics, artificial intelligence, and machine learning techniques. For example, the chatbot program 111 may be implemented with IBM's Node-RED programming tool to provide application logic which links the data (e.g., semantic data 112, electronic documents 117, etc.) and supporting services (e.g., tone analyzer 113, sentiment analyzer 114, speech-to-text service 115) to the Watson Assistant service 116, user interface 102, supporting backend system and database 120 as needed to design and operate the chatbot 130. In other embodiments, the chatbot back-end program 111 may include a message receipt module, a message parser, and a response module. The message receipt module represents software and/or hardware for receiving chat messages transmitted from a user 101. The message parser represents software for parsing chat messages received by the message receipt module from user 101. The message parser is generally responsible for electronically interpreting the subject of the chat messages, such as by using natural language processing, computational linguistics, artificial intelligence, and/or machine learning techniques to perform interpret the chat message into computer-usable form for further use herein. For example, the message parser may use natural language processing software to parse and understand each chat message. The natural language processing software may be rule-based in nature or based around a machine learning model. The natural language processing software may extract intent and/or entities from each chat message (or group of chat messages) for later use. "Intent" includes purposes and/or goals expressed in each chat message or group of chat message's, including seeking an answer to a question or processing a bill payment. "Entities" include both entity types and entity subtypes which categorize a purpose of each chat message or group of chat messages. Examples of entities include, for example anatomy, health condition, person, sport, product, product type, geographic location, problem type, etc. In the case of vocal messages received from the user 101, message parser uses speech recognition software to first parse the message into text for further processing, such as via the natural language processing software as discussed above and below. Message parser may also use natural language processing for parsing each chat message or multiple chat messages together for determining message type, message negation, and message sentiment. "Message type" may indicate, for example, that each chat message is a question, statement, definition, or exclamation. "Message negation" may indicate whether each chat message is negative. "Message sentiment" may indicate what sentiment is expressed in each chat message. Message sentiment may be obtained, for example, in the cast of text-based messages from software specialized to detect sentiment from parsed words, and in the case of voice messages from the parsed words themselves, as well as user tone, loudness, urgency, etc.

As shown in FIG. 1, the chatbot program 111 may be hosted on a cloud computing platform 110 which will be understood to refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include specified characteristics (e.g., on-demand service, broad network access, resource pooling, rapid elasticity, and measured service), service models (e.g., Software as a Service (SaaS), Platform as a Service (PaaS), and Infrastructure as a Service (IaaS)), and deployment models (e.g., private cloud, community cloud, public cloud, and hybrid cloud) which provide a service-oriented environment with a focus on statelessness, low coupling, modularity, and semantic interoperability. However, while this disclosure includes a detailed description of a cloud computing environment example, it is to be understood that the implementation of the teachings recited herein are not limited to a cloud computing environment. Rather, embodiments of the present invention are capable of being implemented in conjunction with any other type of computing environment now known or later developed.

To provide a way to measure and improve the performance of the chatbot 130, the chatbot system 100 includes a computing system 10 connected across a computer network 18 to the cloud-based chatbot back-end program 111 and supporting data and services 112-117. Over the network 18, the computing system 17 communicates with other devices or components in the cloud 110 via one or more wired and/or wireless data communication links, where each communication link may comprise one or more of wires, routers, switches, transmitters, receivers, or the like. Thus connected, the computing system includes a chatbot scoring engine 16 which is configured to interact with a chatbot dialog flow 131 and other cloud-based data/services 110 to instrument and monitor user/chatbot interactions and evaluate the chatbot performance. Generally speaking, the chatbot scoring engine 16 is configured to instrument individual nodes (e.g., N1, N2 . . . N12) in a chatbot dialog flow 131, to capture and analyze the specified node performance metrics based on user interactions with the dialog flow, to score each node with a weighted award or penalty based on the captured performance metrics, and to assess the performance for the overall dialog flow (or individual dialog flow paths) based on the award/penalty scores.

To instrument one or more of the individual nodes (e.g., N1, N2 . . . N12), the chatbot scoring engine 16 may include a node instrument/monitor module 13 which may be used by the dialog flow designer to insert detection tools or instruments for tracking user communications with the node in terms of one or more performance metrics, such as the time, access count, content, sentiment, phase, and outcome of each communication. With reference to the example dialog flow node tree 131, the node instrument/monitor module 13 may be used to insert a Count Node instrument (NC) at the input to each dialog flow node (e.g., N1-N9, N11-N12) for registering or detecting when a user 101 has accessed or "touched" a point in the dialog flow 131. The node instrument/monitor module 13 may also be used to insert a Repeat Node instrument (NR) at any input to a dialog flow node (e.g., N1) wherein the conversational flow by the user 101 represents a regressive feedback dialog flow wherein the user is seeking to clarify or repeat a step in the dialog flow 131. In addition, the node instrument/monitor module 13 may be used to insert a Success Node instrument (NS) at any input to a dialog flow node (e.g., Automated Goal 136) wherein the conversational flow by the user 101 represents a successful automated outcome in the dialog flow 131. In similar fashion, the node instrument/monitor module 13 may be used to insert a Human Node instrument (NH) at any input to a dialog flow node (e.g., Human Goal 137) wherein the conversational flow by the user 101 represents an outcome in the dialog flow 131 where human interaction is required (e.g., direct assist, oversight, etc.). The node instrument/monitor module 13 may also be used to insert a Confusion Node instrument (NZ) at any input to a dialog flow node (e.g., N10) wherein the conversational flow by the user 101 indicates there is confusion by the user or system. In addition, the node instrument/monitor module 13 may be used to insert a Failure Node instrument (NF) at any input to a dialog flow node (e.g., Failure 138) wherein the conversational flow fails (e.g., an explicit utterance or user hang-up).

As will be appreciated, the node instrument/monitor module 13 may be used to insert any specified or custom node (e.g., NX) at any input to a dialog flow node (e.g., N6) to track or capture any desired feature that may be useful for achieving the specified outcomes 135. For example, a custom node (NX(i)) may capture features (e.g., humor, user emotional state, context, profanity, formality, etc.) from the user/node interactions that correlate to one or more outcomes 135. In addition or the alternative, the custom node (NX(i)) may capture illuminating information about the user or process. For example, informative or "illuminating" moments about the user (e.g., IU(i)) can be tracked or monitored at a custom node NX which captures informative "good moments" in the dialog flow to show when and where the dialog flow succeeds in achieving automated goals and/or human outcomes so that the dialog flow designer can understand what part(s) of the dialog flow are working well. Similarly, a custom node NX can track informative or "illuminating" moments about the system (e.g., IS(i)) where the dialog flow is better informed about the goals and desires outcomes (e.g., at N6), thereby clarifying the need for changes to the dialog flow to make it work better.

In addition to instrumenting real nodes (e.g., N1-N12), the node instrument/monitor module 13 may also be used to instrument virtual nodes (e.g., VN) that are located between human-time-nodes (e.g., N5 and N8). For example, a virtual node may include circuit test points on the system's backend to understand process (e.g., measurements between V66, V67, measured in milliseconds).

Once the nodes in the dialog flow node tree 131 are instrumented, the node instrument/monitor module 13 may also be used to track user communications with the dialog flow 131 in terms of one or more specified performance metrics, such as the time, access count, content, sentiment, phase, and outcome of each communication. For example, the node instrument/monitor module 13 may be used to measure the total number of user access operations at each node during one or more conversational flows. In addition or in the alternative, the node instrument/monitor module 13 may be used to make time measurements for how much time is spent at each node. For example, a first time metric is computed as the total time spent in aggregate until completion of one of the outcomes 135, such as T(total_success) which represents the time required to reach an automated goal 136, or T(abandon_effort) which represents the time required to reach a failure outcome 138. As will be appreciated, the amount of time spent at each node type can be informative to the dialog flow designer. Thus, the node instrument/monitor module 13 may use the timestamps collected at each node instrument (e.g., T(N1) . . . T(N12)) to determine the total amount of time T(total) for a user's interactions with the chatbot 130 and/or to identify delay areas or "hot spots" at nodes (e.g., the time taken at N2 before arriving at N3) which correlate with failures or user frustration. Such information can be informative and actionable to the dialog flow designer because they indicate areas to potentially improve the dialog flow.

To assist with the performance assessment of the chatbot dialog flow 131, each node may be scored with a weighted award or penalty based on the captured performance metrics. To this end, the chatbot scoring engine 16 may include a scoring module 14 which the dialog flow designer may use to score one or more real or virtual nodes (e.g., N1-N12, VN) in the dialog flow tree 131 and to define a scoring function which measures how well the dialog flow has performed based on certain desired outcomes of the dialog being achieved (e.g., 136), such as capturing N parameters through the interaction and serving a result accordingly. For example, the scoring module 14 may be used to score individual nodes (e.g., N1) based on a measured performance metric for a phase of a communication, a human sentiment, a transition, and an elapsed time at the node. To score a node in the dialog flow tree 131 for communication phase, the scoring module 14 may apply a score based on the node's phase, with Success Nodes getting higher or reward scores. Repeat Nodes getting lower scores, and Failure Nodes getting lowest or penalty scores. To score a node in the dialog flow tree 131 for human sentiment, the scoring module 14 may use natural language processor 12 (NLP), alone or in combination with the cloud-based services (e.g., tone analyzer 113, sentiment analyzer 114, speech-to-text service 115, assistant service 116) to detect a human sentiment (e.g., satisfaction, frustration, confusion, happy, and sad) from the user communication with the node, and then assign a corresponding score. To score a node in the dialog flow tree 131 for a transition, the scoring module 14 may apply a score based on the node's natural language classification of the utterance—detecting a user's desire to change the conversation; or routing to an atypical destination node not anticipated in typical dialog flow. And to score a node in the dialog flow tree 131 for elapsed time, the scoring module 14 may apply higher or reward scores for nodes with short elapsed times, and may apply lower or penalty scores for nodes with longer elapsed times.

In addition to scoring individual transition nodes, the chatbot scoring engine 16 may score outcomes from the chatbot dialog flow 131 based on various criteria. For example, the scoring module 14 may assign Goal Outcome Scores (e.g., GA(i)) to each of the automated goals 136 which are accomplished by the automated dialog system, as designed. While all of the automated goals 136 may satisfy the design objectives, some may be more valuable or desirable, in which case they are assigned higher/reward scores. In similar fashion, the scoring module 14 may assign different Human Interaction Scores (e.g., GH(i)) to each of the human goals 137 which are accomplished by human intervention, with differentiated scoring based on the relative role of any chatbot assistance since some bots are better than others. For example, if a chatbot pre-populates 95% of the required information for a purchase, so that the human assistance is only needed to complete or verify a transaction, this is a good outcome, and the chatbot is therefore scored with reward points. However, if the chat fails or leaves most of the work for the human agent to complete, then the chatbot is scored with penalty points. Finally, the scoring module 14 may assign one or more penalty scores (e.g., F(i)) to each of failure outcome 138, with different penalty scores being assigned to failure outcomes, such as hang-up abandonment, or detected profanity and threats of lawsuits in the communications, or soft fail feedback moments. As will be appreciated, many scoring outcomes (and nodes) will be flagged as human goals 137, while others may be semi-automated or automated. For example, a "call terminated" node would be flagged as a failure node (NF) by human; and a "needing to repeat question/clarify answer" could be done manually, or suggested by system that reviews dialog data (prior knowledge).

In addition to scoring outcomes 135, the chatbot scoring engine 16 may score different zones and pathways of the dialog flow node tree 131 based on various criteria. For example, the scoring module 14 may assign a "clarify" score ZC to a zone of nodes where user interactions suggest that the dialog flow is not clear. For example, a clarify zone 132 including nodes N1>N7>N8>N1) may be assigned a penalty score ZC of a particular user type U(n) if the captured performance metrics indicate that the path usage is high for a user type, indicating that there is a poor fit for these users and this chatbot structure may be poorly designed, a bad fit for the user, or otherwise may have actionable intelligence. In addition, the scoring module 14 may assign a "best path" score ZB to a zone of nodes where user interactions suggest that the dialog flow is well designed to achieve the desired outcomes. For example, a best path zone 133 including nodes N1>N2>N3>N4>N5>N6 may be assigned a reward score (e.g., ZB(i)) for a particular user type U(n) if the captured time measurements indicate that the path has a good design with clear communications and efficiency in achieving the automated goal 136 (e.g., item purchase). As will be appreciated, a high ratio between the ZB to ZC scores for a specific user type in a chatbot system indicates that the system is well designed for the user type. In addition, the scoring module 14 may assign a "confused path" score ZZ to a zone of nodes where user interactions suggest that the dialog flow is poorly designed to achieve the desired outcomes. For example, a confused path zone 134 including nodes N1>N2>N3>N9>N10>N12) may be assigned a penalty score (e.g., ZZ(i)) for a particular user type U(n) if the captured performance metrics indicate that the path has a defective design with unclear communications that result in failure outcomes 138 (e.g., hang-up). As will be appreciated, a high ratio between the ZZ to ZB scores for a specific user type in a chatbot system indicates that the system is poorly designed for the user type. As will be appreciated, the scoring module 14 may assign other zoning scores (e.g., ZX(i)) to non-obvious nodes or pathways in a zone that are not flagged by dialog designers, but only discovered through machine learning as the dialog system is used over time. For example, if user interactions with the chatbot dialog flow 131 reveal a 30% improved outcome for users who take an "atypical but delightful" path to completion (e.g., N1>N2>N9>N10>N5>N6), then these nodes may be assigned a reward score.

In each of the scoring assessments performed by the chatbot scoring engine 16, the user state and/or satisfaction may be used to compute any particular node score. For example, the scoring module 14 may compute a consumer satisfaction (CSAT) score for each node (e.g., N4) that tracks user sentiment and satisfaction by user type, user state, and/or user information, by using the NLP 12 (NLP), alone or in combination with the cloud-based services (e.g., tone analyzer 113, sentiment analyzer 114, speech-to-text service 115, assistant service 116) to detect a human sentiment (e.g., satisfaction, frustration, confusion, happy, anger, and sad) from the user communication with the node, and then assign a corresponding score. In this way, the chatbot scoring engine 16 can track changes in the "state of mind" of users during interaction with the chatbot dialog flow 131 to test causality at each node or path as a way to elicit informative or actionable data for the dialog flow designer.

In addition to scoring individual nodes, zones of nodes, and outcomes, the chatbot scoring engine 16 may also determine an aggregate scoring measure for the full chatbot 130 so that each user interaction can include a set of aggregates, and one OVERALL score for the user's interaction with the chatbot dialog flow tree 131. For example, the scoring module 14 may compute a total score (e.g., Score(total)) as the aggregation of all scores for Time/Efficiency (e.g., T(i)), Goal Outcome Scores (e.g., GA(i)), Human Interaction Scores goodbad (e.g., GH(i)), Zone Node Path Scores (e.g., ZC(i), ZB(i), ZZ(i). ZX(i)), Confusion Avoidance Scores (e.g., NZ(i)), and Information Enrichment Scores (e.g., IU(i), IS(i)). As disclosed herein, the total computed score is informative on system performance, and may be used to benchmark the dialog flow for improvement and training (manual or automated). In addition, the total score can be used with machine learning applications to predict or suggest "best fit" dialog flow design changes by user type, user state, and/or user goals.

In order to evaluate the performance of the chatbot dialog flow 131, the chatbot scoring engine 16 may include a dialog flow assessment module 15 which uses the assigned reward/penalty scores to measure how well the dialog flow has performed based on certain desired outcomes of the dialog being achieved. For example, the dialog flow assessment module 15 may retrieve logs of conversation chats between the users 101 and chatbot 130, capture scoring parameters from the interactions, and assess the dialog flow performance based on the scores for each node and/or outcome. As changes to the dialog flow are made over time, the dialog flow assessment module 15 can quantitatively compare the dialog flow performance assessments of different dialog flows. Furthermore, the dialog flow assessment module 15 can cluster or group different chats based on identified parameters to further suggest customization of the dialog flow, either in aggregate or for individual nodes or paths. In suggesting performance improvements or flags, the dialog flow assessment module 15 can assist human dialog flow designers in understanding areas for improvement to the dialog flow. To this end, the dialog flow assessment module 15 can provide automated machine learning mechanisms with features and signals to better achieve desired outcomes or objectives, and can validate hypotheses by measuring chatbot performance improvements when changes or improvements are made to the design flow.

Types of information handling systems that can utilize chatbot scoring engine 16 range from small handheld devices, such as handheld computer/mobile telephone to large mainframe systems. Examples of handheld computer include iPhones, iPads, Visualization devices using augmented Reality glasses and tablets, personal digital assistants (PDAs), personal entertainment devices, such as MP3 players, portable televisions, and compact disc players. Other examples of information handling systems include pen, or tablet, computer, laptop, or notebook, computer, personal computer system, and server. Many of the information handling systems include nonvolatile data stores, such as hard drives and/or nonvolatile memory. Some of the information handling systems may use separate nonvolatile data stores (e.g., server utilizes nonvolatile data store, and mainframe computer utilizes nonvolatile data store). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
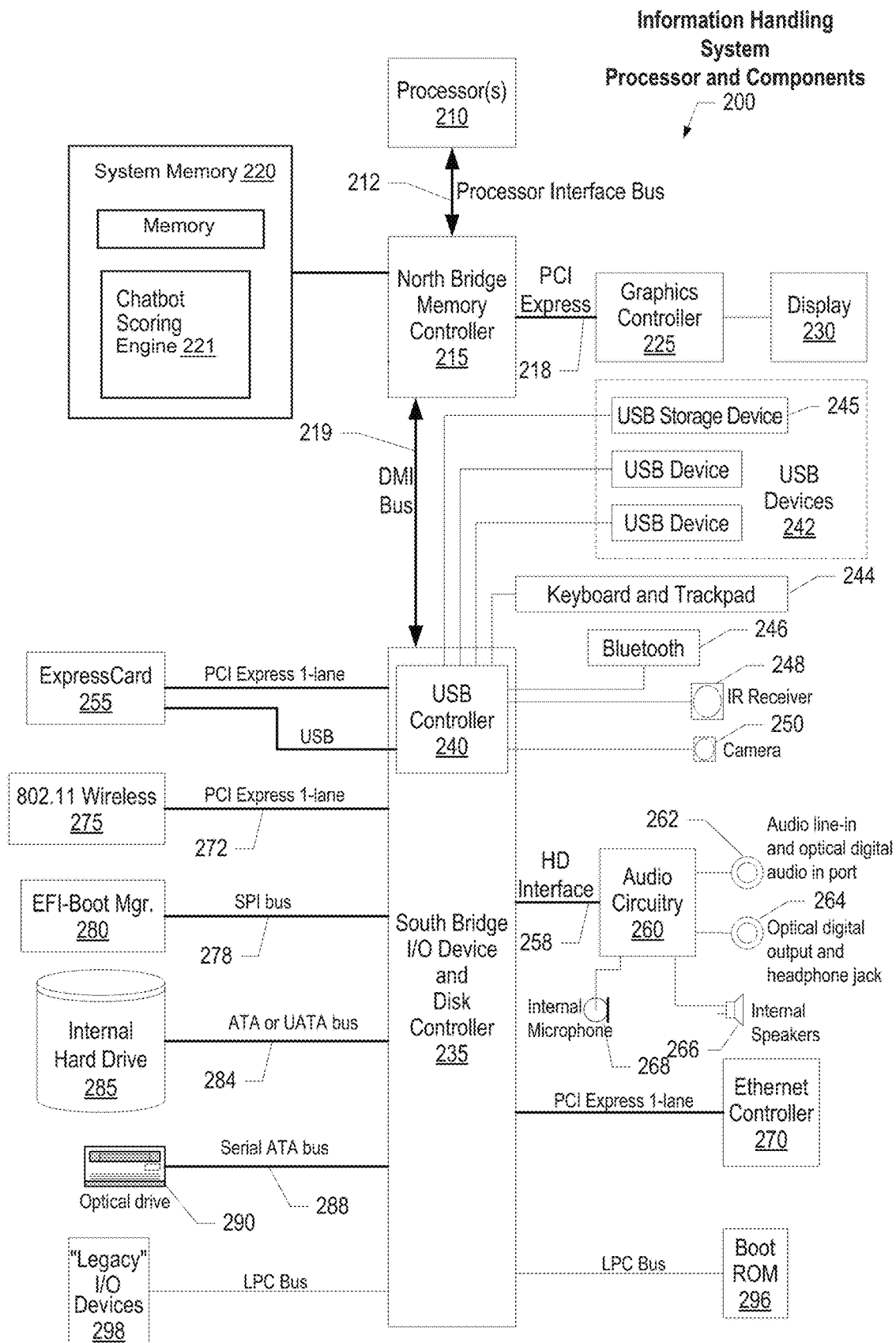
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a chatbot scoring engine module 221 which interacts with a dialog flow to instrument, score, monitor, and evaluate user/chatbot interactions at specific nodes of a dialog flow node tree using a semantic, quantitative, and/or machine learning analysis to score the chatbot performance. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
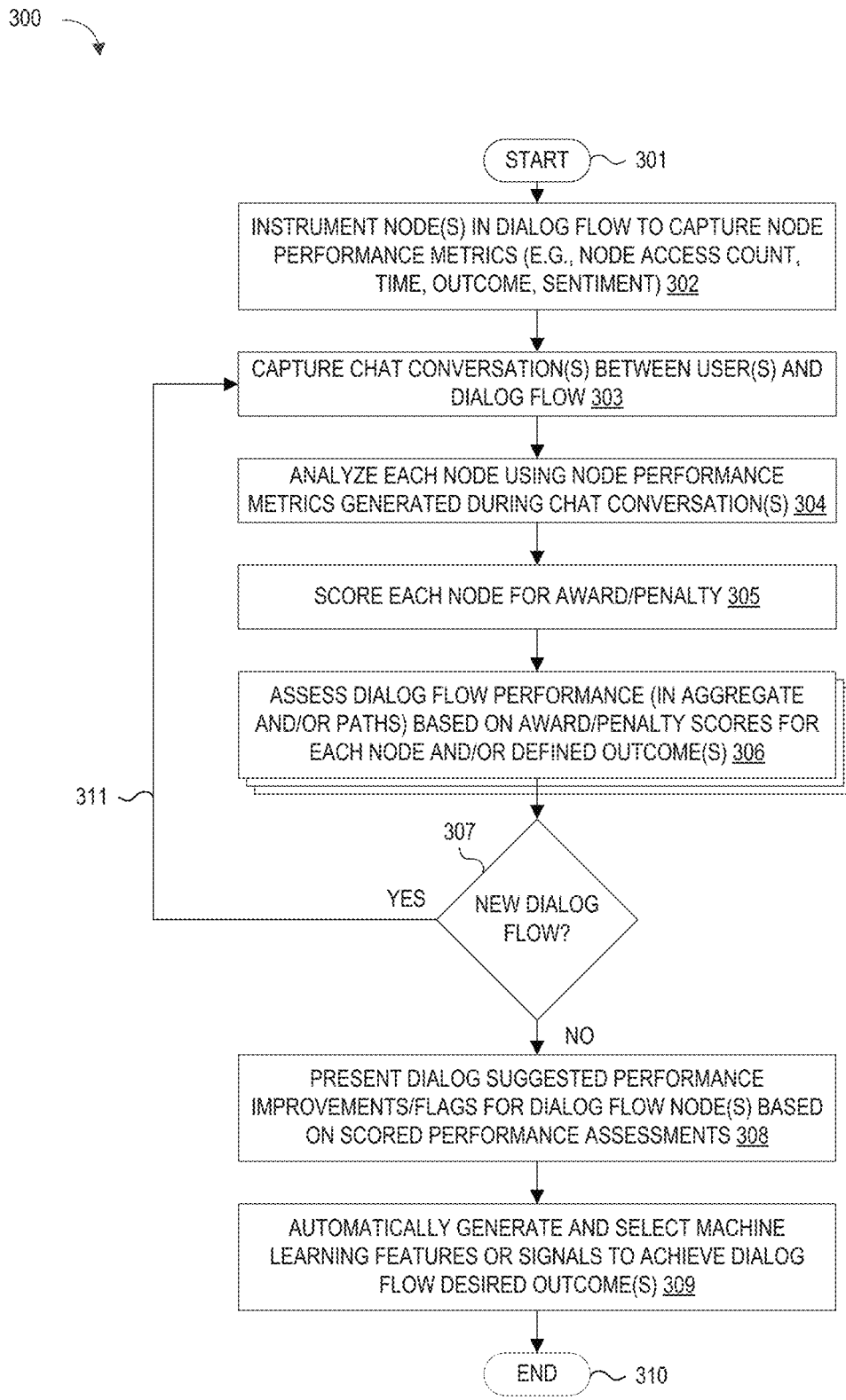
FIG. 3 illustrates a simplified flow chart showing the logic for instrumenting, monitoring, scoring, and assessing the performance of a chatbot.

FIG. 3 depicts an approach that can be executed on an information handling system to assign reward and penalty points for various nodes in the dialog flow for use in defining a scoring function which measures how well the dialog flow has performed on the basis of specified performance metric parameters, such as phase of a communication, human sentiment, transition, and/or elapsed time at each node or path in the dialog flow. By defining the reward and penalty points based on certain user types and/or desired outcomes of the dialog being achieved through user/chatbot interaction, the performance metric parameters may be used to assess the performance of dialog flow nodes and/or suggest chatbot design changes or improvements thereto. This approach can be included within the chatbot system 100, first computing system 17, or provided as a separate computing system, method, or module. Wherever implemented, the disclosed chatbot performance scoring scheme identifies design problems in a chatbot design flow by using the cognitive power of the information handling system to measure, capture, and analyze the specified node performance metrics based on user interactions with the dialog flow, to score each node with a weighted award or penalty based on the captured performance metrics, and to assess the performance for the overall dialog flow (or individual dialog flow paths) based on the award/penalty scores. With the disclosed chatbot performance scoring scheme, an information handling system can be configured to identify areas for improvement in a chatbot dialog flow, thereby improving the accuracy of training for the QA system.

To provide additional details for an improved understanding of selected embodiments of the present disclosure, reference is now made to FIG. 3 which depicts a simplified flow chart 300 showing the logic for instrumenting, monitoring, scoring, and assessing the performance of a chatbot. The processing shown in FIG. 3 may be performed by a cognitive system, such as the chatbot system 100, first computing system 17, or other cognitive computing system.

FIG. 3 processing commences at 301 hereupon, at step 302, one or more nodes in a chatbot dialog flow are instrumented to capture node performance metrics, such as access counts for different node types (e.g., NC, NR, NS, NH, NZ, NX), time stamps for any node access, outcome, user sentiment, and the like). For example, each node in a dialog flow tree may be configured with a detection tool or instrument for tracking user communications with the node in terms of one or more performance metrics, such as the time, access count, content, sentiment, phase, and outcome of each communication. The processing at step 302 may be performed at the first computing system 17 and/or chatbot scoring engine 16 by using the node instrument/monitoring unit 13 and/or NLP 12, alone or in combination with the cloud-based services (e.g., tone analyzer 113, sentiment analyzer 114, speech-to-text service 115, assistant service 116) to insert instruments in the dialog flow nodes.

Once a dialog flow is instrumented, chat conversations between the user(s) and dialog flow can be captured at step 303. As the conversation chats between the chatbot and end users are run, the performance metrics detected by the instrumented nodes can be logged or stored. The processing at step 303 may be performed at the first computing system 17 and/or chatbot scoring engine 16 by using the node instrument/monitoring unit 13 and/or NLP 12, alone or in combination with the cloud-based services (e.g., 113-116) to capture the conversations and related node performance metrics. Once captured and stored, a chat conversation and performance metrics can be retrieved and scored for performance and comparison with other dialog flows, as described hereinbelow.

At step 304, one or more nodes from the dialog flow are analyzed using the node performance metrics generated during the chat conversations. For example, a node in a dialog flow tree may be assessed on the basis of the specified node performance metrics to determine the number and type of node accesses, time spent at each node, communication emotion or sentiment or tone, node outcomes, and the like. In addition, the processing at step 304 may capture illuminating information about the user or process, such as illuminating information about the user (e.g., IU(i)) or about the system (e.g., IS(i)). The processing at step 304 may be performed at the first computing system 17 and/or chatbot scoring engine 16 by using the dialog flow assessment unit 15 and/or NLP 12, alone or in combination with the cloud-based services (e.g., 113-116) to assess each dialog flow node.

At step 305, one or more nodes from the dialog flow are scored by applying award or penalty points. For example, penalty or reward scores may be applied to each node on the basis of user type/state/information, node efficiency, and/or outcome such that award points are assigned to nodes that efficiently move a specific user type to a desired outcome, while penalty points are assigned to nodes which require significant time for user action or otherwise results in undesired outcomes may be scored with penalty points. As will be appreciated, the scores assigned at step 305 may be configurable (to allow for different user-defined functions) and/or weighted (to reflect that some nodes are more important than others). The processing at step 305 may be performed at the first computing system 17 and/or chatbot scoring engine 16 by using the scoring unit 14 and/or NLP 12, alone or in combination with the cloud-based services (e.g., 113-116) to assign (weighted) scores, such as scores for Time/Efficiency (e.g., T(i)), Goal Outcome Scores (e.g., GA(i)), Human Interaction Scores good/bad (e.g., GH(i)). Zone Node Path Scores (e.g., ZC(i), ZB(i), ZZ(i), ZX(i)), Confusion Avoidance Scores (e.g., NZ(i)), and Information Enrichment Scores (e.g., IU(i), IS(i)). As will be appreciated, the actual scoring of nodes will be based on the user interaction with the dialog flow. For example, each node accessed by the user may have its access count incremented at each touch, or possibly decremented for any failure to proceed.

At step 306, one or more dialog flow performance assessment steps are performed using the assigned award/penalty scores for each node and/or defined outcomes. For example, the aggregate dialog flow and/or individual dialog flow paths may be assessed by combining the weighted scores for each node and/or outcome. The performance assessment at step 306 may also generate illuminating information about user features. The processing at step 306 may be performed at the first computing system 17 and/or chatbot scoring engine 16 by using the dialog flow assessment unit 15 and/or NLP 12, alone or in combination with the cloud-based services (e.g., 113-116) to identify low scoring nodes or zones in the chatbot design flow (where there may be design problems for a particular user type U(n)) and/or high scoring nodes or zones in the chatbot design flow (where the design flow is efficiently accomplishing design flow goals for a particular user type U(n)). In addition, the processing at step 306 may also cluster or group chats based on identified parameters to further suggest customization of the flow based on scoring outcomes. In general terms, the processing at step 306 uses the applied scores to improve the dialog flow experience for the user by maximizing the user's "joy" (as indicated by detected sentiments and emotion scores), to expedite the user's access to a desired outcome (as indicated by the detected elapsed time scores), to avoid "pain nodes" in the dialog flow (as indicated by penalty scores for delay or confusion or failure), to reduce the likelihood of needing a human agent and/or maximizing the likelihood of connecting the user to the right human agent. In addition, the assigned scores may depend on the user type to provide a meaningful signal in predicting the best path forward by type. For example, an uncertainty score for a particular user type at the beginning of the design flow may inform design flow decision points along the way (e.g., human vs. automated). For example, if the user type indicates that a failure risk or outcome uncertainty from an automated outcome is too high for the user type, then the decision point directs the flow to a human intervention.

As indicated with the feedback line 311, steps 303-306 may be repeated for any new dialog flow (e.g., affirmative outcome to detection step 307) so that different implementations of the dialog flow can be quantitatively compared and contrasted on the basis of chatbot performance. However, if there is no additional dialog flow to evaluate (e.g., negative outcome to detection step 307), then the process proceeds to make design recommendations for improving the dialog flow. In particular, the dialog flow designer may be presented with one or more suggested performance improvements and/or flags at step 308 for use with a dialog flow node based on the scored performance assessment(s). The processing at step 308 may be performed at the first computing system 17 and/or chatbot scoring engine 16 by using the dialog flow assessment unit 15 and/or NLP 12, alone or in combination with the cloud-based services (e.g., 113-116) to present design improvement suggestions on a display device 11.

At step 309, one or more machine learning features or signals may be automatically generated and selected to achieve desired outcomes for the dialog flow, such as achieving or avoiding certain outcomes. To illustrate the processing at step 309 where machine learning is applied to generate an "Informative Moment," consider an example where a user/caller to a Cable/Media provider (e.g., Comcast or Verizon) interacts with a chatbot dialog flow where there are certain nodes or node-groups (paths) in the dialog tree that yield rich information to help the system better understand the user/caller. If the user/chatbot communications reveal that the user/caller loves Hockey, hates Baseball, and uses Profanity in a playful manner, this information may prove informative in (1) tuning user preferences for media consumption and (2) understanding that the customer using profanity does not always indicate anger with the system. As a result, the dialog flow features would be selected so that the caller is NOT ejected to human agent when profanity is used, but is instead placed in a "playful profanity" subclass of users. Consider another example where there is a small subclass of users that encourages the system just to jump straight to a desired outcome, such as when a technically proficient person that gives the system ALL the required "change of address" information, thereby leapfrogging multiple nodes that were designed to collect that information. In the case where the user knows the system and is impatient with their time, this TYPE of user (namely, a high octane, proficient TYPE) is an informative signal which the system can respond to by speeding up the audio cues or speed by 1.25 or 1.5 times. The processing at step 309 may be performed at the first computing system 17 and/or chatbot scoring engine 16 by using the dialog flow assessment unit 15 and/or NLP 12, alone or in combination with the cloud-based services (e.g., 113-116) to apply machine learning and deep learning techniques to generate and select features or signals that will accomplish design flow goals for a particular user type U(n)). After using the chatbot performance scoring process 300 to assess and improve the chatbot performance, the process ends at step 310.

Selected embodiments of the present disclosure are described with reference to scoring chatbot performance on the basis of node performance metrics which are analyzed to assess the dialog flow nodes. However, it will be appreciated that the present disclosure may also be applied to consume previously recorded chats and prior knowledge to improve the dialog flow by creating different trees based on different chat logs/audiences. In addition, the chatbot performance scoring techniques may be used to provide responsive and dynamic dialog flow adjustments to respond to individual user conditions in real time, thereby increasing the likelihood of achieving desired outcomes. The disclosed chatbot performance scoring techniques may also be used to provide personalized and dynamic dialog flows that are tailored to each user's specific user type, thereby adjusting the dialog flow tree to provide increased technical support (for low proficiency users) or reduced technical support (for high proficiency users).

By now, it will be appreciated that there is disclosed herein a system, method, apparatus, and computer program product for scoring performance of a chatbot with an information handling system having a processor and a memory. As disclosed, the information handling system inserts detection instruments at selected nodes in a dialog flow of the chatbot to track user communications with said selected nodes in terms of one or more performance metrics selected from a group consisting of time of node access, access count, content, sentiment, emotion, phase, user type, user state, user information, and outcome of each communication. The information handling system also captures specified node performance metrics based on user interactions with one or more nodes in a dialog flow for the chatbot, such as by logging conversation chats between one or more users and the chatbot. In addition, the first information handling system assigns a score to each of the one or more nodes based on the specified node performance metrics. In selected embodiments, the score is assigned by applying an algorithm to generate one or more assessments for each node based on the specified node performance metrics, and then applying a weighted award or penalty score to each node based on the one or more assessments generated for said node. In such embodiments, each assessment generated for each node is selected from a group consisting of a number and type of node accesses, elapsed time at each node, communication emotion or sentiment or tone, and node outcomes. The information handling system also assesses a performance measure for at least a portion of the chatbot by combining scores assigned to selected nodes in the dialog flow. In selected embodiments, the performance measure is assessed by selecting a first plurality of nodes defining a dialog flow path, and then adding each score assigned to each of the first plurality of nodes to generate a performance score for the dialog flow path. In other embodiments, the performance measure is assessed by combining scores assigned to selected nodes in the dialog flow based on a user type, user state, or user information to generate a first performance measure. Based on the performance measure, the information handling system may suggest performance improvements or flags for making changes to one or more nodes in the dialog flow. In addition, one or more of the scores may be leveraged as learning features for a machine learning process that is applied to improve the dialog flow.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of scoring performance of a chatbot, the method comprising:
   capturing, by an information handling system comprising a processor and a memory, specified node performance metrics based on user interactions with one or more nodes in a dialog flow for the chatbot;
   assigning, by the information handling system, a score to each of the one or more nodes based on the specified node performance metrics; and
   assessing, by the information handling system, a performance measure for at least a portion of the chatbot by combining scores assigned to selected nodes in the dialog flow.

2. The method of claim 1, further comprising:
   inserting, by the information handling system, detection instruments at selected nodes in the dialog flow to track user communications with said selected nodes node in terms of one or more performance metrics selected from a group consisting of time of node access, access count, content, sentiment, emotion, phase, and outcome of each communication.

3. The method of claim 1, where the specified node performance metrics are selected from a group consisting of time of node access, access count, content, sentiment, emotion, phase, user type, user state, user information, and outcome of each communication.

4. The method of claim 1, where capturing specified node performance metrics comprises logging, by the information handling system, conversation chats between one or more users and the chatbot.

5. The method of claim 1, where assigning the score comprises:
   applying, by the information handling system, an algorithm to generate one or more assessments for each node based on the specified node performance metrics; and
   applying, by the information handling system, a weighted award or penalty score to each node based on the one or more assessments generated for said node.

6. The method of claim 5, where each assessment generated for each node is selected from a group consisting of a number and type of node accesses, elapsed time at each node, communication emotion or sentiment or tone, and node outcomes.

7. The method of claim 1, where assessing the performance measure comprises:
   selecting, by the information handling system, a first plurality of nodes defining a dialog flow path; and
   adding, by the information handling system, each score assigned to each of the first plurality of nodes to generate a performance score for the dialog flow path.

8. The method of claim 1, where assessing the performance measure comprises generating a first performance measure by combining scores assigned to selected nodes in the dialog flow based on a user type, user state, or user information.

9. The method of claim 1, further comprising suggesting, by the information handling system, performance improvements or flags for making changes to one or more nodes in the dialog flow based on the performance measure.

10. The method of claim 1, further comprising leveraging, by the information handling system, one or more of the scores as learning features for a machine learning process that is applied to improve the dialog flow.

11. An information handling system comprising:
    one or more processors;
    a memory coupled to at least one of the processors;
    a set of instructions stored in the memory and executed by at least one of the processors to score performance of a chatbot, wherein the set of instructions are executable to perform actions of:
    capturing, by the system, specified node performance metrics based on user interactions with one or more nodes in a dialog flow for the chatbot;
    assigning, by the system, a score to each of the one or more nodes based on the specified node performance metrics; and
    assessing, by the system, a performance measure for at least a portion of the chatbot by combining scores assigned to selected nodes in the dialog flow.

12. The information handling system of claim 11, wherein the set of instructions are executable to insert detection instruments at selected nodes in the dialog flow to track user communications with said selected nodes node in terms of one or more performance metrics selected from a group consisting of time of node access, access count, content, sentiment, emotion, phase, and outcome of each communication.

13. The information handling system of claim 11, where the specified node performance metrics are selected from a group consisting of time of node access, access count, content, sentiment, emotion, phase, user type, user state, user information, and outcome of each communication.

14. The information handling system of claim 11, wherein the set of instructions are executable to assign the score to each of the one or more nodes by:
    applying, by the system, an algorithm to generate one or more assessments for each node based on the specified node performance metrics; and
    applying, by the system, a weighted award or penalty score to each node based on the one or more assessments generated for said node.

15. The information handling system of claim 14, where each assessment generated for each node is selected from a group consisting of a number and type of node accesses, elapsed time at each node, communication emotion or sentiment or tone, and node outcomes.

16. The information handling system of claim 11, wherein the set of instructions are executable to assess the performance measure by:
- selecting, by the system, a first plurality of nodes defining a dialog flow path; and
- adding, by the system, each score assigned to each of the first plurality of nodes to generate a performance score for the dialog flow path.

17. The information handling system of claim 11, wherein the set of instructions are executable to assess the performance measure by combining scores assigned to selected nodes in the dialog flow to generate a first performance measure based on a user type, user state, or user information.

18. The information handling system of claim 11, wherein the set of instructions are executable to suggest performance improvements or flags for making changes to one or more nodes in the dialog flow based on the performance measure.

19. The information handling system of claim 11, wherein the set of instructions are executable to leverage one or more of the scores as learning features for a machine learning process that is applied to improve the dialog flow.

20. A computer program product stored in a computer readable storage medium, comprising computer instructions that, when executed by an information handling system, causes the system to score a performance of a chatbot by:
- inserting, by the system, detection instruments at selected nodes in the dialog flow to track user communications with said selected nodes node in terms of one or more performance metrics selected from a group consisting of time of node access, access count, content, sentiment, emotion, phase, and outcome of each communication;
- capturing, by the system, specified node performance metrics based on user interactions with one or more nodes in a dialog flow for the chatbot;
- assigning, by the system, a score to each of the one or more nodes based on the specified node performance metrics;
- assessing, by the system, a performance measure for at least a portion of the chatbot by combining scores assigned to selected nodes in the dialog flow; and
- suggesting, by the system, performance improvements or flags for making changes to one or more nodes in the dialog flow based on the performance measure.

* * * * *